July 9, 1946.　　　　F. E. FREY　　　　2,403,714
PROCESS FOR THE TREATMENT OF HYDROCARBONS
Filed July 11, 1942
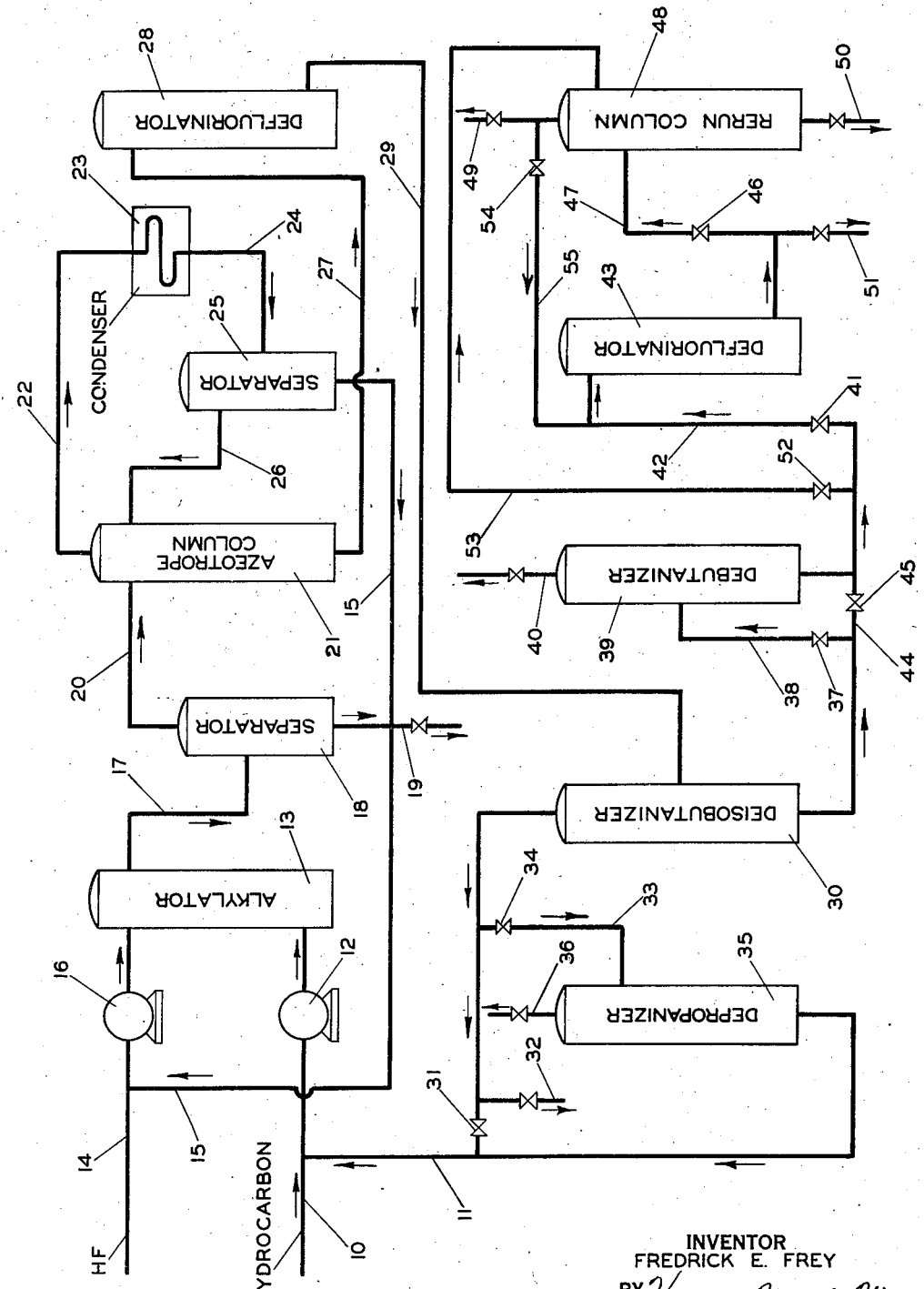
INVENTOR
FREDRICK E. FREY
BY Hudson, Young & Yinger
ATTORNEYS Patented July 9, 1946

2,403,714

UNITED STATES PATENT OFFICE 2,403,714

PROCESS FOR THE TREATMENT OF HYDROCARBONS

Frederick E. Frey, Bartlesville, Okla., assignor to Phillips Petroleum Company, a corporation of Delaware Application July 11, 1942, Serial No. 450,587

19 Claims. (Cl. 260—683.4)

This invention relates to the treatment of hydrocarbon materials. More particularly, it relates to the conversion, by an alkylation reaction in the presence of a fluorine-containing catalyst, of relatively low-boiling hydrocarbons to motor fuel hydrocarbons. Still more particularly, it relates to the removal of organically combined fluorine from the product of such conversion. This application is a continuation-in-part of my copending application, Serial No. 398,361, filed June 16, 1941, now U. S. Patent 2,347,945, issued May 2, 1944.

In the manufacture of hydrocarbons by processes in which fluorine-containing catalysts are used, small proportions of organic fluorine-containing by-products are formed. These processes may involve reactions such as polymerization and alkylation of relatively low-boiling hydrocarbons to produce motor-fuel hydrocarbons in the presence of catalysts comprising one or more of such fluorine compounds as hydrofluoric acid, boron trifluoride, and the like. Although the exact nature or composition of the organic fluorine-containing by-products which may be formed has not been definitely established, they are believed to be predominantly alkyl and/or aryl fluorides. They are not completely removed by washing the hydrocarbons with alkali solutions. They tend to decompose at elevated temperatures, such as those employed in fractional distillation of the hydrocarbons, thereby forming hydrofluoric acid, which is corrosive, especially in the presence of moisture. In gases, they may thus cause corrosion of handling equipment; in liquid motor-fuel hydrocarbons, they are undesirable for reasons that are obvious.

According to the aforementioned co-pending application, organic fluorine compounds may be removed from hydrocarbon materials containing them by contacting such hydrocarbon materials with solid porous contact materials. Contact materials which have been found suitable include those known to be catalytically active for hydrogenation or dehydrogenation reactions, such as alumina gel, activated alumina, dehydrated bauxite, chromium oxide, mixtures of alumina and chromium oxide, metals of the iron group, especially finely divided nickel deposited on an inert support, and the like. Such contact materials appear to adsorb preferentially the organic fluorine compounds, although the exact mechanism involved is not fully known at present. The hydrocarbon material being treated may be in either the liquid or the vapor phase. Also, according to the aforementioned co-pending application, in a process for alkylating relatively low-boiling alkylatable hydrocarbons in the presence of fluorine compounds, a selected part or all of the hydrocarbon effluent from an alkylating zone may be advantageously subjected to the action of a solid porous contact material to remove organic fluorine compounds.

An object of this invention is to effect substantially complete removal of fluorine from hydrocarbon fluids containing organic fluorine compounds as impurities.

A further object of this invention is an improved process for obtaining a substantially fluorine-free alkylate from the alkylation of hydrocarbons in the presence of a catalyst comprising a fluorine compound.

Other objects and advantages will be apparent from the following description, the accompanying drawing, and/or the appended claims.

In accordance with the present invention, I have now found that the undesirable organic fluorine compounds differ among themselves with respect to the ease with which the organic fluorine can be removed. For example, when the total hydrocarbon effluent from a hydrofluoric acid alkylation process is treated to remove fluorine, as by contacting with bauxite, and subsequently is separated into fractions of different boiling ranges, the residual organic fluorine, which has not been removed by the defluorinating treatment, is concentrated in the relatively high-boiling fractions. Although it is possible by the process of the aforementioned copending application to remove substantially all fluorine in a single treatment by using sufficiently drastic operating conditions, I have found it is advantageous to treat the alkylation effluent under such conditions that the low-boiling organic fluorine is removed, then to separate from the effluent at least one relatively high-boiling fraction, and finally to treat this relatively high-boiling fraction to remove the high-boiling organic fluorine. Thereby the most advantageous conditions for the removal of each type of organic fluorine can be used, and equipment of a given size or capacity can be utilized to the fullest advantage.

Understanding of my invention may be aided by reference to the accompanying drawing, which is a schematic flow-diagram of one arrangement of apparatus for practicing the invention.

An alkylatable hydrocarbon and an alkylating agent, for example an isoparaffin such as isobutane or isopentane and an olefin such as propylene or one or more of the butylenes, respectively, are admitted preferably through a number of inlets, such as that represented by inlet 10, and/or through conduit 11 and pump 12 to alkylator 13, in which they are agitated under alkylating conditions with concentrated or substantially anhydrous hydrofluoric acid, which may be admitted through inlet 14 and/or conduit 15 and pump 16. In the feeds to alkylator 13 the mol ratio of isoparaffin to olefin, or other alkylating agent, such as the corresponding alcohol or halide or the like, preferably having three to five carbon atoms in the alkyl group, is preferably in the range of 2:1 to 20:1 or more, and the weight ratio of hydrofluoric acid to total hydrocarbons is preferably in the range of about 0.2:1 to 4:1. The feed, or at least the portion of the feed which contains the alkylating agent, is preferably introduced into the reaction mixture under conditions of high turbulence and/or in multipointwise fashion, so that the alkylating agent is rapidly mixed and reacted with the isobutane or other alkylatable hydrocarbon. This procedure is advantageous in order to favor the desired olefin-isoparaffin junctures, or alkylation reactions, and to hinder undesirable olefin-olefin junctures, or polymerization reactions. Preferred operating conditions in alkylator 13, as for example for alkylating isobutane with butylenes, to which for the sake of simplicity this description may be primarily devoted, are a temperature in the range of 30° to 150° F., a pressure sufficient to maintain all components in the liquid phase, and a contact time or time of residence in the alkylator of about 1 to 30 or more minutes; however, conditions outside of these ranges may be used without passing beyond the scope of this invention. The optimum alkylating conditions vary with different reactants; for example, in alkylating benzene with ethylene, or normal butane with olefins, in the presence of hydrofluoric acid as a catalyst, the preferred temperature is in the range of 200° to 350° F.

After a suitable contact or reaction time, the resulting mixture passes through conduit 17 to separator 18, wherein it is separated into two liquid phases, as by cooling and/or gravitational or centrifugal means. The heavier or hydrofluoric acid phase preferably is recycled, as through conduit 15, to alkylator 13; part of it may be withdrawn, as through valved outlet 19, and passed to purification or acid-recovery steps, not shown in the drawing.

The lighter or hydrocarbon phase is passed through conduit 20 to azeotrope column 21, in which it is separated by fractional distillation into two fractions. The overhead fraction consists of an azeotropic mixture of hydrogen fluoride and low-boiling paraffin hydrocarbons, such as propane and isobutane. This fraction is passed through conduit 22, condenser 23, and conduit 24 to separator 25, wherein it is separated into two liquid phases, as by cooling and/or gravitational or centrifugal means. All of the lighter or hydrocarbon phase is returned through conduit 26 as reflux to azeotrope column 21; the heavier or hydrofluoric acid phase may be recycled, as through conduit 15, to alkylator 13.

The bottom fraction from column 21, which consists of hydrocarbons that are substantially free from dissolved hydrogen fluoride but that comprise organically combined fluorine, is passed through conduit 27 to defluorinator 28. Defluorinator 28 may consist of any suitable closed chamber, containing a dehydrogenation-hydrogenation-type contact mass, through which the hydrocarbons may be passed. Specific contact masses which have been found suitable are alumina gel, activated alumina, dehydrated bauxite, chromium oxide, mixtures of alumina and chromium oxide, metals of the iron group, especially finely divided nickel deposited on an inert support, floridin, diatomaceous earth, and the like. Such contact materials appear to adsorb preferentially the organic fluorine compounds, although the exact mechanism involved is not fully known. The hydrocarbon material being treated may be in either the liquid or the vapor phase; since the volume is relatively small in the liquid phase condition, and since all the materials involved in this process are easily maintained in the liquid state under the preferred operating conditions, it is preferably treated in the liquid state. In general, the conditions of temperature and contact time in defluorinator 28 should be well below those which would induce deterioration or alteration of the hydrocarbon material. Temperatures between about 50 and 400° F. may be employed. The optimum temperature in any particular instance will depend upon the nature of the contact mass, the nature of the material being treated, and the desired degree of removal of fluorine. The preferred temperature, particularly when bauxite is used, is approximately equal to or somewhat lower than the kettle temperature of column 21, and is usually in the range of about 150 to 350° F. By using such a temperature, the necessity for heating or cooling in defluorinator 28 is avoided, and the removal of fluorine, especially of that fluorine which upon distillation of the fluorine-containing material appears in the low-boiling distillate fractions, such as the isobutane and butane fractions, is sufficiently complete that corrosion of equipment by fluorine compounds in the hydrocarbon material is substantially completely eliminated. While the same type of contact material may be utilized in both steps, different materials of the class described may be used in each defluorinating step.

At relatively high temperatures, very high space velocities, such as about 2000 or 3000 volumes of vapor (or an equivalent number of volumes of liquid) per volume of contact material per hour, are satisfactory; at relatively low temperatures, the space velocity should be comparatively low, such as perhaps 1 or 2 volumes of liquid per hour. In general the optimum space velocity depends not only upon the temperature but also upon such factors as the content of fluorine, the pressure used, the desired extent of fluorine removal, and the particular contact material in use. A suitable space velocity for any particular application may be readily found by trial by one skilled in the art.

The partially defluorinated hydrocarbon material passes from defluorinator 28 through conduit 29 to deisobutanizer 30, whereby it is separated into two fractions. The overhead fraction, which contains isobutane, may be recycled through valve 31 and conduit 11 to hydrocarbon inlet 10, or part or all of it may be withdrawn through valved outlet 32 to a desired additional processing step, not shown, such as a dehydrogenation step to produce olefins for use in alkylator 13. If a substantial proportion of low-boiling material other than isobutane, such as propane and lighter, is present in this fraction, preferably at least part of it is passed through conduit 33 having valve 34 to depropanizer 35, wherefrom undesired low-boiling material is withdrawn as an overhead fraction through valved outlet 36, and isobutane is recycled from the kettle through conduit 11 to hydrocarbon inlet 10.

The bottom fraction from deisobutanizer 30 may be passed through valve 37 and conduit 38 to debutanizer 39, wherefrom an overhead fraction comprising normal butane is withdrawn through valved outlet 40, and a kettle fraction comprising normally liquid hydrocarbons may be passed through valve 41 and conduit 42 to defluorinator 43. If the bottom fraction from deisobutanizer 30 does not contain objectionable proportions of normal butane, it may be by-passed around debutanizer 39, as through conduit 44 having valve 45.

Defluorinator 43 removes or destroys residual objectionable proportions of organic fluorine compounds, not previously removed by defluorinator 28, from the normally liquid alkylate. If desired, it may be operated at a somewhat higher temperature than defluorinator 28. A temperature in the range of about 150 to 500° F. is usually satisfactory. The exact optimum temperature will depend upon the proportion of fluorine to be removed, the activity of the contact mass, and the space velocity; it may be readily determined for any particular set of conditions by trial. Preferably, in order to avoid the necessity for heating or cooling in defluorinator 43, the temperature is approximately equal to or slightly lower than the kettle temperature of debutanizer 39 (or deisobutanizer 30 if debutanizer 39 is by-passed). This temperature, which may be in the range of about 200 to 400° F., is somewhat higher than the corresponding preferred temperature in defluorinator 28 and is therefore more advantageous for removing the relatively difficultly removable or high-boiling organic fluorine which is concentrated in the normally liquid hydrocarbons. The optimum space velocity is not critical but depends somewhat upon the temperature and the nature of the contact mass; usually a space velocity in the range of 1 to 10 volumes of liquid per volume of contact mass per hour will be found satisfactory. Preferably, the operation is in the liquid phase because equipment for handling the materials in the liquid condition is relatively smaller and less costly than that for handling the materials in the gaseous condition.

The resulting substantially fluorine-free normally liquid hydrocarbons from defluorinator 43 are passed through valve 46 and conduit 47 to rerun column 48, wherefrom a gasoline fraction of highly branched saturated hydrocarbons is withdrawn as a product of the process through valved outlet 49. A relatively high-boiling fraction comprising chiefly by-product hydrocarbons boiling above the gasoline range may be withdrawn from column 48 through valved outlet 50.

There are many modifications or alternatives of my process, which at times may be preferable to those specifically indicated hereinbefore. For example, if the effluent from defluorinator 43 does not contain objectionable proportions of high-boiling material, it may be withdrawn as final product, suitable for blending in aviation gasoline, through valved outlet 51. In another alternative, the normally liquid fraction from column 30 or from column 39 may be passed through valve 52 and conduit 53 to rerun column 48. A minor high-boiling fraction from rerun column 48 may be withdrawn through outlet 50, and the major overhead fraction comprising highly branched hydrocarbons boiling within the gasoline range is passed through valve 54 and conduit 55 to defluorinator 43. The resulting substantially fluorine-free hydrocarbon material, which is suitable for blending in aviation gasoline, is withdrawn from defluorinator 43 through valved outlet 51.

*Example I*

The total hydrocarbon effluent from a continuous hydrofluoric acid alkylation run made with a feed comprising isobutane, normal butane, propylene, and butylenes was contacted with bauxite in a stainless steel tube. The hydrocarbon alkylation effluent contained 0.0097 per cent by weight of organically combined fluorine. The bauxite had been calcined at 1100° F. The temperature of the bauxite was 180° F., and the pressure was sufficient to maintain liquid-phase conditions. The space velocity was varied from 2.0 to 6.3 volumes of liquid feed per volume of bauxite per hour during the run; the variation in space velocity, however, did not greatly affect the efficiency or completeness of defluorination. The total length of the run was 738 hours, during which time 2047 volumes of hydrocarbon material were treated. Although, on the assumption that it retained all of the removed fluorine, the bauxite had acquired a fluorine content of 13 per cent of its own weight at the end of the run, it showed no loss in efficiency. At all times the removal of fluorine was more than 90 per cent complete as shown by analysis.

Three samples of the treated hydrocarbon were taken. The residual fluorine in each sample was determined and found to be 0.0006, 0.0004, and 0.0007 per cent by weight. Part of each sample was separated by distillation into a fraction containing normal butane and lighter hydrocarbons, and into a fraction containing normally liquid hydrocarbons. The fluorine content of the low-boiling fractions was found to be 0.0002, 0.0001, and 0.0001, respectively, and the fluorine content of the normally liquid fractions was found to be 0.0014, 0.0013, and 0.0013, respectively.

This shows that, when a hydrocarbon mixture containing organically combined fluorine is contacted at a moderate temperature with bauxite, and is subsequently separated into two fractions of different boiling ranges, the lower-boiling fraction may be substantially free of organically combined fluorine whereas the higher-boiling fraction may still contain objectional proportions of organic fluorine. In order to effectively remove the major part of the residual fluorine, the higher boiling normally liquid fraction may then be contacted in a defluorinator with bauxite at about 250° F., and a space velocity of 1–10 volumes of liquid per volume of contact mass per hour. This second defluorination step effects substantially complete removal of fluorine from the high boiling fraction.

*Example II*

The process described in Example I is performed utilizing a hydrogenation catalyst consisting of finely divided nickel supported on kieselguhr as the contact material. Substantially complete removal of fluorine is effected.

*Example III*

A hydrocarbon material produced by alkylating isobutane with propylene and butylenes is treated in liquid phase with bauxite to remove fluorine. The treatment may be carried out at a temperature of about 150° F. and a space velocity of about 10 volumes of liquid feed per volume of bauxite per hour. After separation of butane and lighter hydrocarbons, a motor fuel fraction containing about .003 per cent by weight of fluorine may be obtained. This fraction was contacted with an additional quantity of bauxite at 300° F. and a space velocity of 2.3 liquid volumes of hydrocarbon per volume of bauxite per hour and at a pressure of 75 pounds per square inch. The fluorine content of the effluent was found to be .0003 per cent, indicating almost complete removal of fluorine.

Instead of bauxite, the other contact materials described, such as alumina, chromium oxide, etc., may be used in a manner similar to that described above.

Because the invention may be practiced otherwise than as specifically described or illustrated herein, and because many modifications and variations within the spirit and scope of it will be obvious to those skilled in the art, the invention should not be unduly restricted by the foregoing specification and examples, but it should be restricted only in accordance with the appended claims.

I claim:

1. The process of removing organically combined fluorine from mixtures of normally gaseous and normally liquid hydrocarbons containing said fluorine, which comprises subjecting such a mixture to the action of a solid, porous metal oxide catalytically active for hydrogenation and dehydrogenation reactions, at a reaction temperature and for a time sufficient to effect substantial removal of said fluorine from said mixture and such that extensive chemical changes in the hydrocarbons of said mixture are not effected, separating the effluent therefrom into a normally gaseous fraction and a normally liquid fraction, and subjecting the normally liquid fraction to the action of a second solid, porous metal oxide catalytically active for hydrogenation and dehydrogenation reactions, at an elevated temperature to effect further removal of fluorine from said fraction.

2. The process of claim 1 in which the solid, porous metal oxide comprises aluminum oxide.

3. The process of claim 1 in which said metal oxide is alumina in the form of bauxite.

4. The process of claim 1 in which the temperature of the first contacting step is in the range of about 150° to 350° F., and the temperature in the second contacting step is higher than that of said first contacting step and is in the range of about 200° to 400° F.

5. The process for producing normally liquid, highly branched, saturated-type hydrocarbons which comprises subjecting a low-boiling alkylatable paraffin hydrocarbon to the action of an alkylating agent selected from the group which consists of olefins, alcohols, and alkyl halides having three to five carbon atoms per molecule, in the presence of substantially anhydrous hydrofluoric acid as a catalyst in an alkylation zone under alkylating conditions, separating the effluent from said alkylation zone into a hydrofluoric acid phase and a hydrocarbon phase, returning at least part of the acid phase to the alkylation zone, passing the hydrocarbon phase to a fractionation step for removing free hydrogen fluoride, passing the hydrogen fluoride-free hydrocarbon material to a first defluorinating zone containing a solid, porous metal oxide catalytically active for hydrogenation and dehydrogenation reactions, for the removal of a substantial proportion of organically combined fluorine therefrom, debutanizing the effluent from said first defluorinating zone, and passing the remaining hydrocarbons to a second defluorinating zone containing a solid, porous metal oxide catalytically active for hydrogenation and dehydrogenation reactions, for the further removal of organically combined fluorine from said fraction.

6. The process of claim 5 in which the second defluorinating zone is at a higher temperature than the first.

7. The process of claim 5 wherein said metal oxide is alumina in the form of bauxite and in which the temperature in the first defluorinating zone is between about 150 and 350° F. and in the second defluorinating zone is higher than the temperature in said first defluorinating zone and is between about 200 and 400° F.

8. A process for producing normally liquid hydrocarbons substantially free from fluorine-containing compounds, which comprises alkylating a low-boiling alkylatable hydrocarbon with an alkylation agent in an alkylation zone in the presence of a concentrated hydrofluoric acid alkylation catalyst, removing from effluents of said alkylation zone a liquid hydrocarbon material containing hydrofluoric acid in solution, passing said liquid hydrocarbon material to a fractional distillation zone, fractionally distilling said material in said zone at a kettle temperature between about 150 and 350° F. to remove hydrofluoric acid as a low-boiling fraction, passing as a high-boiling kettle product of said distillation zone an essentially hydrofluoric acid-free fluorine-containing hydrocarbon mixture to a first defluorinating zone without substantially cooling or heating said fraction and contacting same, at about the kettle temperature used in said distillation zone, with a solid, porous metal oxide catalytically active for hydrogenation and dehydrogenation reactions for a time such that extensive chemical changes in the hydrocarbons present in said mixture are not effected and such as to effect a substantial removal of fluorine from said mixture, passing effluents of said first defluorinating zone to a separating means, separating a low-boiling hydrocarbon fraction comprising an unreacted alkylatable hydrocarbon, separating further a higher-boiling hydrocarbon fraction containing hydrocarbons produced by said alkylation, passing the last said fraction to a second defluorinating zone and contacting same therein at a temperature between about 200 and 400° F. and higher than that used in said first defluorinating zone with a solid, porous metal oxide catalytically active for hydrogenation and dehydrogenation reactions for a time sufficient to effect no substantial chemical conversion of the hydrocarbons present and such that the total effluent from said treatment is essentially fluorine-free, and recovering from said second defluorinating zone a fluorine-free hydrocarbon alkylate so produced.

9. In a process for producing normally liquid hydrocarbons substantially free from fluorine-containing compounds by alkylation of a low-boiling alkylatable hydrocarbon in the presence of a concentrated hydrofluoric acid alkylation catalyst, the improvement which comprises passing a liquid hydrocarbon material, separated from effluents of such an alkylation zone and containing hydrofluoric acid in solution, to a fractional distillation zone, removing from said material in said zone hydrofluoric acid as a low-boiling fraction, and passing from said distillation zone as a high-boiling fraction an essentially hydrofluoric acid-free fluorine-containing hydrocarbon mixture to a defluorinating zone without substantially heating or cooling said high-boiling fraction and contacting same, at about the kettle temperature used in said distillation zone, with a solid, porous metal oxide catalytically active for hydrogenation and dehydrogenation reactions for a time such that extensive chemical changes in the hydrocarbons present in said mixture are not effected and such as to effect a substantial removal of fluorine from said mixture.

10. A process for producing normally liquid hydrocarbons substantially free from fluorine-containing compounds, which comprises alkylating a low-boiling alkylatable hydrocarbon with an alkylation agent in an alkylation zone in the presence of a concentrated hydrofluoric acid alkylation catalyst, removing from effluents of said alkylation zone a liquid hydrocarbon material containing hydrofluoric acid in solution, passing said liquid hydrocarbon material to a fractional distillation zone, fractionally distilling said material in said zone at a kettle temperature between about 150 and 350° F. to remove hydrofluoric acid as a low-boiling fraction, passing as a high-boiling kettle product of said distillation zone an essentially hydrofluoric acid-free fluorine-containing hydrocarbon mixture to a defluorinating zone without substantially cooling or heating said fraction and contacting same, at about kettle temperature used in said distillation zone, with a solid, porous metal oxide catalytically active for hydrogenation and dehydrogenation reactions for a time such that extensive chemical changes in the hydrocarbons present in said mixture are not effected and such as to effect a substantial removal of fluorine from said mixture.

11. The process of claim 8 in which bauxite is the solid, porous material used in each said defluorinating zone.

12. A process for producing normally liquid paraffin hydrocarbons substantially free from fluorine-containing compounds, which comprises alkylating isobutane with an olefin in an alkylation zone in the presence of a concentrated hydrofluoric acid alkylation catalyst, removing from effluents of said alkylation zone a liquid hydrocarbon material containing hydrofluoric acid in solution, passing said liquid hydrocarbon material to a first fractional distillation zone and therein fractionally distilling said material at a kettle temperature not greater than about 350° F. to remove hydrofluoric acid in a low-boiling overhead fraction, passing as a high-boiling kettle product of said distillation zone an essentially hydrofluoric acid-free fluorine-containing hydrocarbon mixture to a first defluorinating zone without substantially cooling or heating said fraction and contacting same, at about the kettle temperature used in said distillation zone, with a solid porous contact mass comprising alumina for a time such that extensive chemical changes in the hydrocarbons present in said mixture are not effected and such as to effect a substantial removal of fluorine from said mixture, passing effluents of said first defluorinating zone to a second fractional distillation zone, fractionally distilling said material in said second zone at a kettle temperature not greater than about 400° F. and higher than that used in said first distillation zone to remove low-boiling paraffins leaving a liquid alkylate fraction, passing as a high-boiling kettle product of said distillation zone a substantially butane-free fluorine-containing alkylate fraction to a second defluorinating zone without substantially cooling or heating said fraction and contacting same, at about the kettle temperature used in said second distillation zone and at a temperature higher than that used in said first defluorinating zone, with a solid porous contact material comprising alumina for a time sufficient to effect no substantial chemical conversion of the hydrocarbons present and such that the total effluent from said treatment is substantially fluorine-free, and recovering from said second defluorinating zone a substantially fluorine-free paraffinic hydrocarbon alkylate so produced.

13. The process of claim 12 in which said contact masses comprise bauxite.

14. The process of claim 9 in which said solid, porous metal oxide comprises aluminum oxide.

15. The process of claim 10 in which said solid, porous metal oxide comprises aluminum oxide.

16. The process of claim 9 in which said metal oxide is alumina in the form of bauxite.

17. The process of claim 10 in which said metal oxide is alumina in the form of bauxite.

18. The process of claim 5 in which said metal oxide in each of said defluorinating zones is aluminum oxide and in which the temperature in the first defluorinating zone is between about 150 and 350° F. and in the second defluorinating zone is higher than the temperature in said first defluorinating zone and is between about 200 and 400° F.

19. The process of claim 8 in which said metal oxide in each of said defluorinating zones comprises aluminum oxide.

FREDERICK E. FREY.